United States Patent [19]
Sato

[11] Patent Number: 5,386,179
[45] Date of Patent: Jan. 31, 1995

[54] AC POWER DRIVEN ELECTROLUMINESCENT DEVICE

[75] Inventor: Yoshihide Sato, Kanagawa, Japan

[73] Assignee: Fuji Xerox Co., Ltd., Tokyo, Japan

[21] Appl. No.: 40,569

[22] Filed: Mar. 31, 1993

Related U.S. Application Data

[63] Continuation of Ser. No. 717,415, Jun. 17, 1991, abandoned.

[30] Foreign Application Priority Data

Jun. 20, 1990 [JP] Japan ............... 2-159693

[51] Int. Cl.6 ............................... G09G 3/10
[52] U.S. Cl. ......................... 315/169.3; 257/57; 257/365; 345/105
[58] Field of Search ............. 315/169.1, 169.3; 357/2, 23.14, 23.2, 23.7; 340/825.81, 785, 781, 760; 257/59, 57, 347, 365, 367, 409

[56] References Cited

U.S. PATENT DOCUMENTS

| | | | |
|---|---|---|---|
| 3,339,128 | 8/1967 | Olmstead et al. | 257/365 |
| 3,872,491 | 3/1975 | Hanson et al. | 257/365 |
| 4,528,480 | 7/1985 | Unagami et al. | 357/23.1 |
| 4,984,040 | 1/1991 | Yap | 357/23.14 |
| 5,095,248 | 3/1992 | Sato | 315/169.3 |

OTHER PUBLICATIONS

"Device Design Considerations of a Novel High Voltage Amorphous Silicon Thin Film Transistor", Russel A. Martin, Peng Kein Yap, Michael Hack and Hsing Tuan, Xerox Palo Alto Research Center. May 1987.

"A 6×6-in 20-Ipi Electroluminescent Display Panel", by T. P. Brody. Fang Chen Luo, Zoltan P. Szepesi and David H. Davies. Sep. 1975.

"1988 International Display Research Conference", by J. Vanfleteren, P. De Visschere, J. De Beets, I. De Rycke, J. Doutreloigne and A. Van Calster. Jan. 1988.

*Primary Examiner*—Robert J. Pascal
*Assistant Examiner*—Michael B. Shingleton
*Attorney, Agent, or Firm*—Finnegan, Henderson, Farabow, Garrett & Dunner

[57] ABSTRACT

An electroluminescent device including an electroluminescent cell, and a switching element connected to the electroluminescent cell. The switching element has an offset area and a unit for applying a voltage to the offset area. According to the electroluminescent device, a higher withstand voltage for the switching element can be obtained, and an adequate flow of drain current in the switching element is insured.

6 Claims, 3 Drawing Sheets

AC POWER DRIVEN ELECTROLUMINESCENT DEVICE

This application is a continuation, of application Ser. No. 07/717,415, filed Jun. 17, 1991, now abandoned.

BACKGROUND OF THE INVENTION

This invention relates to an electroluminescent (EL) device for use in matrix type EL display systems or the exposing unit electronic imaging systems. More particularly, this invention relates to an EL device that permits the use of amorphous silicon (a-Si) in the semiconductor layer of a thin-film transistor (TFT) that drives an EL cell.

An equivalent circuit for a conventional EL device for one bit of pixel in a matrix type EL display system or an array of EL cells is shown in FIG. 6. The EL device is composed of a first switching element $Q_1$ (TFT), a storage capacitor Cs connected at one terminal to the source terminal of the switching element $Q_1$, a second switching element $Q_2$ (TFT) whose gate terminal is connected to the source terminal of the first switching element $Q_1$ and whose source terminal is connected to the other terminal of the storage capacitor Cs, and an EL cell $C_{EL}$ connected at one terminal to the drain terminal of the second switching element $Q_2$ and at the other terminal to an EL driving power source Va. The first switching element $Q_1$ turns on in response to a switching signal SCAN applied to its gate terminal and as this first switching element $Q_1$ turns on or off, data is written into the storage capacitor Cs in response to a luminescence signal DATA. Namely, when a luminescence signal DATA (H) is written into the storage capacitor Cs, the resulting voltage is applied to the gate terminal of the second switching element $Q_2$ to turn it on, causing the EL cell $C_{EL}$ to emit light with power supplied from the drive source Va. When the luminescence signal DATA is at low (L) level, the storage capacitor Cs is discharged via the first switching element $Q_1$.

When the second switching element $Q_2$ is off, the power from the drive source Va is applied between its drain and source electrodes. Therefore, the second switching element $Q_2$ is required to withstand voltage about twice as high as is supplied from the drive source Va. The element is also required to have a correspondingly low current characteristic. To meet these conditions, the semiconductor layer of the switching element has been made from limited materials exemplified by cadmium selenite (CdSe) and polycrystalline silicon (poly-Si). However, cadmium selenite (CdSe) has had the problem that its drain voltage vs. drain current characteristic is unstable and varies with time to present difficulty in maintaining a constant level of luminance of the EL element $C_{EL}$. As for poly-Si, a high process temperature is necessary to form a poly-Si layer and this makes poly-Si unsuitable for the purpose of fabricating a large-area device by integrating the EL cell $C_{EL}$ and the switching element $Q_2$ into a unitary assembly on a common substrate.

With a view to solving those problems associated with cadmium selenite (CdSe) and polycrystalline silicon (poly-Si), a switching element having the configuration shown in FIG. 7 has been proposed. This switching element uses amorphous silicon (a-Si) for a semiconductor layer 4 and to increase the withstand voltage of the second switching element $Q_2$, its gate electrode 2' is offset in position towards the source electrode 6b. As FIG. 3 shows, the drain voltage vs. drain current characteristic of this switching element is satisfactory in terms of the off-state withstand voltage and drains current. However, if the drain voltage is of negative polarity, only a small drain current will flow. More specifically, if the drain voltage is of negative polarity with respect to the ac signal necessary to drive the EL cell $C_{EL}$, no adequate drain current can be insured as indicated by dashed line A in FIG. 3. To cope with this situation, the drive voltage has to be increased in order to enhance the luminance of the EL cell $C_{EL}$ but then increased power loss will occur. In addition, the switching element $Q_2$ is required to withstand an even higher voltage.

SUMMARY OF THE INVENTION

The present invention has been achieved under these circumstances and has an object providing an EL device that permits amorphous silicon (a-Si) to be used as the material for the semiconductor layer in thin-film transistors that drive EL cells and which yet has satisfactory withstand voltage and drain current characteristics.

This object of the present invention can be attained by an EL device that has an EL cell and a switching element connected to the EL cell, the switching element having an offset area and a unit for applying a voltage to the offset area.

According to the present invention, as the switching element has an offset area, a higher withstand voltage for that switching element can be obtained. The switching element also has the unit for applying a voltage to the offset area, so that the element can be held in a ON-state by applying voltage to the offset area at drain voltages of negative polarity and this insures an adequate flow of drain current in the switching element.

DETAILED DESCRIPTION OF THE INVENTION

An embodiment of the present invention will be descried below with reference to FIG. 1.

Figure 1:
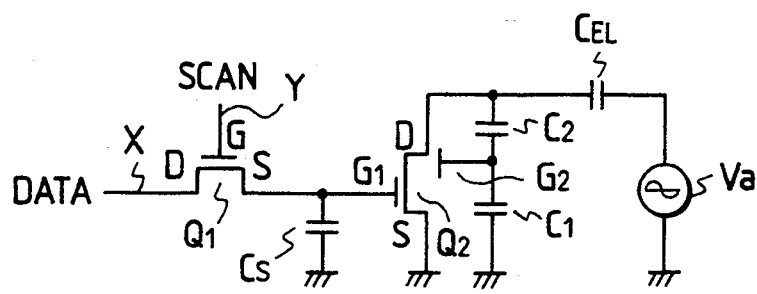
FIG. 1 is an equivalent circuit diagram for an EL device according to an embodiment of the present invention.

FIG. 1 is an equivalent circuit diagram for an EL device according to an embodiment of the present invention, which shows one bit in a matrix type EL display system or an array of EL cells.

A first switching element $Q_1$ (TFT) is so configured that a luminescence signal DATA can be supplied to an information signal line X on the drain side, with the source side being connected to a storage capacitor Cs which is grounded at one end. A switching signal line Y is connected to the gate of the first switching element $Q_1$ and a switching signal SCAN will be applied to that line Y. The source of the first switching element $Q_1$ is connected to the first gate $G_1$ of a second switching element $Q_2$ (TFT). An EL driving power source Va [Va=Vpk sin($\omega$t)] is connected to the drain of the second switching element $Q_2$ via an EL cell $C_{EL}$. The source of the second switching element $Q_2$ is grounded. In the above equation, Vpk represents a peak voltage, $\omega$ an angular velocity, t a time.

In addition to the usual first gate $G_1$, a second gate $G_2$ is also formed in the second switching element $Q_2$. This second gate $G_2$ is connected to the junction point between capacitors $C_1$ and $C_2$. The non-junction terminal of the capacitor $C_1$ is grounded whereas the non-junction terminal of the capacitor $C_2$ is connected to the drain of the second switching element $Q_2$, so that the second gate $G_2$ of the second switching element $Q_2$ will normally be supplied with a voltage obtained by dividing the voltage Va by the EL cell $C_{EL}$ and the capacitors $C_1$ and $C_2$. Thus, the voltage to be applied to the second gate $G_2$ is controlled using the EL driving power source Va.

The configuration of the second switching element $Q_2$ will be described below in greater detail.

Figure 2:
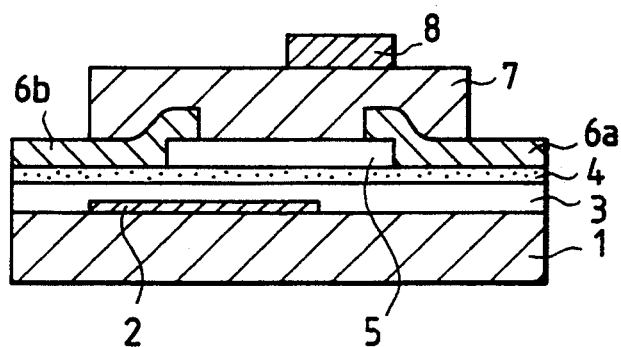
FIG. 2 is a cross-sectional diagram of a switching element $Q_2$ having an offset structure according to the embodiment.

As shown in FIG. 2, the second switching element $Q_2$ comprises a substrate 1 on which are superposed, in order, a first gate electrode 2 (corresponding to the first gate $G_1$ shown in FIG. 1) which is made of a metal such as chromium (Cr), an insulation layer 3 made of SiNx, a semiconductor layer 4 made of amorphous silicon (a-Si), an upper insulation layer 5, a drain electrode 6a, and a source electrode 6b. The switching element $Q_2$ is so constructed that the drain electrode 6a will not overlap the first gate electrode 2. In other words, the two electrodes are offset from each other to insure a higher withstand voltage for the drain electrode.

A polyimide coat is applied over the upper insulation layer 5, the drain electrode 6a and the source electrode 6b to form another insulation layer 7. A second gate electrode 8 (corresponding to the second gate $G_2$ shown in FIG. 1) is formed on top of the insulation layer 7 in a position that corresponds to the offset area defined above.

Figure 6:
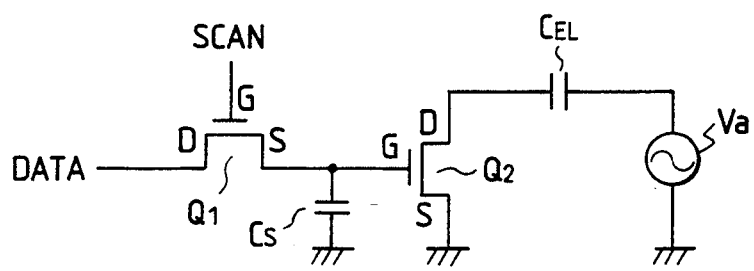
FIG. 6 is an equivalent circuit diagram for a conventional EL device.

The operation of the second switching element $Q_2$ will be described below with reference to FIG. 1 but it is operated in basically the same way as the switching element $Q_2$ already described in connection with the conventional device shown in FIG. 6.

Figure 3:
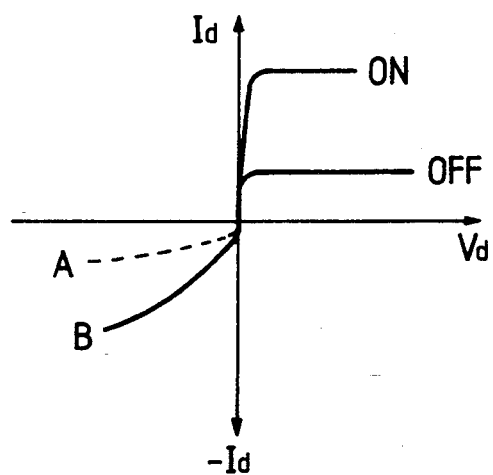
FIG. 3 is a graph showing the drain voltage vs. drain current characteristic curve for the switching element $Q_2$ having an offset structure.

First suppose that a data voltage is applied to the first gate $G_1$ of the second switching element $Q_2$ to turn it on. If, in this case, the voltage supplied from the EL driving power source Va [Va=Vpk sin($\omega$t)] to the drain of the second switching element $Q_2$ is of positive polarity, a sufficient current to drive the EL cell will flow as shown in FIG. 3.

Figure 7:
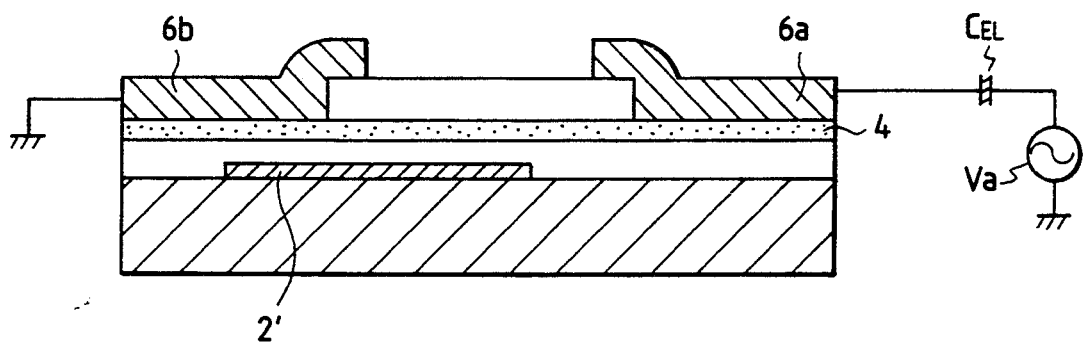
FIG. 7 is a cross-sectional diagram of a switching element $Q_2$ having the conventional offset structure.

Referring to the same situation (i.e., the second switching element $Q_2$ is turned on), if the voltage supplied from the power source Va [Va=Vpk sin($\omega$t)] to the drain of the second switching element $Q_2$ is of negative polarity, the voltage $Vgd_1$ between the first gate $G_1$ and the drain will normally be of positive polarity. In the switching element $Q_2$ having the conventional structure (shown in FIG. 7), no adequate source-drain current flows because the offset region formed between the first gate $G_1$ and the drain presents a high resistance enough to limit the passage of current. Thus, in accordance with the present invention, the second gate $G_2$ is provided in that region and a voltage obtained by dividing the voltage Va by the EL cell $C_{EL}$ and the capacitors $C_1$ and $C_2$ is applied to the second gate $G_2$. With this arrangement, if the drain electrode is supplied with a negative voltage, $Vgd_2$ or the voltage between the second gate $G_2$ and the drain will normally be at positive polarity to keep the switching element $Q_2$ turned on. As a result, the source-drain current Id for the case where the drain voltage Vd applied to the drain electrode is of negative polarity can be increased from the level indicated by dashed line A (which is obtained with the conventional offset structure) to the level indicated by solid line B as shown in FIG. 3. In FIG. 3, the current Id is indicated on a logarithmic basis.

Figure 4:
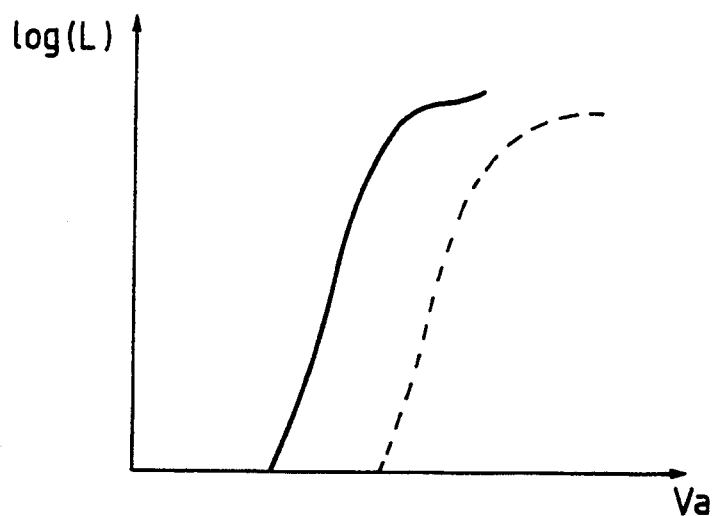
FIG. 4 is a graph showing the relationship between drive voltage (Va) and luminance (L) of the EL device.

Hence, the negative drain voltage that is necessary for obtaining a sufficient current to drive the EL cell can be set to a lower level than in the case using a switching element having the conventional offset structure, and this contributes to a reduction in the voltage that has to be supplied from the EL driving power source Va. Accordingly, the relationship between the voltage Va and the luminance L of the EL cell is shifted from the characteristic indicated by the dashed line to that indicated by the solid line as shown in FIG. 4.

Figure 5:
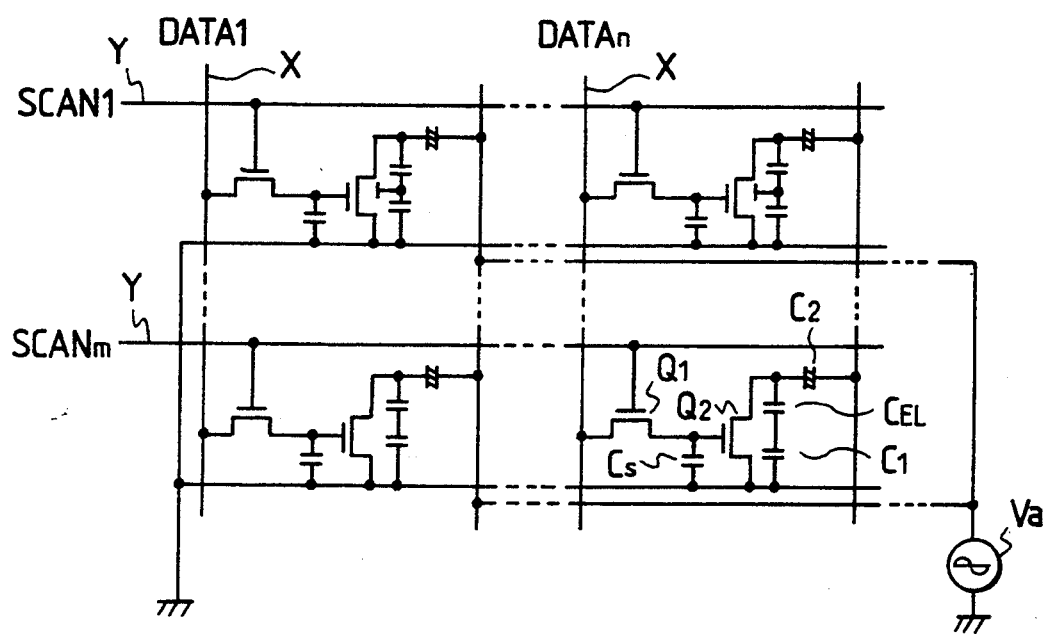
FIG. 5 is an equivalent circuit diagram for the case where the EL device shown in FIG. 1 is used in a matrix type EL display system.

FIG. 5 shows a drive circuit for the case where the EL device of the present invention is applied to a matrix type EL display system having m×n bits. As shown in FIG. 5, a plurality of one-pixel drive circuits each shown in FIG. 1 are arranged into a matrix consisting of m rows by n columns and the gates of the drive circuits in each row are connected to a common switching signal line Y whereas the drains of the drive circuits in each column are connected to a common information signal line X. In FIG. 5, the components which are the same as those shown in FIG. 1 are identified by like symbols and will not be described in detail.

In the embodiment described above, the voltage to be applied to the second gate $G_2$ of the second switching element $Q_2$ is controlled by capacitors $C_1$ and $C_2$ that are connected in series between the drain and the source of that element. It should, however, be noted that another circuit configuration can be adopted as long as a voltage can be applied to the second gate $G_2$ when the drain of the switching element $Q_2$ is at negative polarity.

The EL device of the present invention which has been described above offers the following advantages. First, amorphous silicon (a-Si) can be used as the material for the semiconductor layer in the second switching element $Q_2$. Amorphous silicon (a-Si) which can be formed by a low-temperature process is suitable for fabricating large-area EL cell arrays or matrix type EL display systems having a plurality of EL cells formed in a unitary assembly with switching elements. Secondly, the second switching element $Q_2$ has an offset structure that provides it with a capability for withstanding a higher voltage. Third, a gate electrode is formed in the offset area of the second switching element $Q_2$ and this insures that a sufficient current characteristic to drive the EL cell is obtained when a drain voltage of negative polarity is applied.

According to the present invention, the switching element has an offset area that helps a higher withstand voltage for the switching element. The switching element also has a means for applying a voltage to the offset area, so the element can be held in a ON-state by applying voltage to the offset area at drain voltage of negative polarity and this insures an adequate flow of drain current in the switching element.

Hence, by using various semiconductor materials, particularly amorphous silicon (a-Si), in the semiconductor layer of the switching element, a large-area device having good characteristics can be easily fabricated. Therefore, the EL device of the present invention is suitable for manufacturing matrix type EL display systems or EL cell arrays.

What is claimed is:

1. An electroluminescent device comprising:
   an electroluminescent cell connected between an AC power supply and a first node;
   first and second capacitors, said first capacitor being connected between said first node and a second node, and said second capacitor being connected to said second node; and
   a switching element comprising:
      first and second electrodes, said first electrode being connected to said first node;
      a first gate spaced apart from said first electrode and overlapping said second electrode and forming an offset area between said first gate and said first electrode; and
      a second gate for applying an AC voltage to said offset area, said second gate being connected to said second node.

2. An electroluminescent device according to claim 1, wherein said switching element is a thin film transistor.

3. An electroluminescent device according to claim 2, wherein a semiconductor layer in said thin film transistor is made of amorphous silicon.

4. An electroluminescent device comprising:
   an electroluminescent cell connected between an AC power supply and a first node;
   first and second capacitors, said first capacitor being connected between said first node and a second node, and said second capacitor being connected to said second node; and
   a switching element comprising:
      first and second electrodes, said first electrode being connected to said first node;
      a first gate spaced apart from said first electrode and overlapping said second electrode and forming an offset area between said first gate and said first electrode; and
      a second gate for applying an AC voltage to said offset area and for enhancing a negative current flowing through said first electrode, said second gate being connected to said second node.

5. An electroluminescent device according to claim 1, wherein said second gate overlaps said first electrode.

6. An electroluminescent device according to claim 1, wherein said second gate is disposed opposing said offset area.

* * * * *